3,256,222
PHENOL FORMALDEHYDE-ANILINE CONDENSATION PRODUCTS PLASTICIZED WITH EPOXYDIZED SOYA OIL
Horst Dalibor and Johann Kühr, Harksheide, near Hamburg, Germany, assignors to Reichhold Chemicals, Inc., White Plains, N.Y.
No Drawing. Filed Oct. 17, 1962, Ser. No. 231,288
Claims priority, application Germany, May 11, 1962, R 32,682
4 Claims. (Cl. 260—19)

The invention relates to a process for preparing internally plasticized phenolic resins, and to the resulting product.

A main drawback of hardenable phenol-formaldehyde resins is their brittleness in the completely hardened stage. The efforts to effectively impart elasticity to these resins are almost as old as the technical application of such resins. The polar nature of hardenable phenolic resins greately restricts the selection of suitable plasticizers. These must be more or less polar compounds that are compatible with the phenolic resin in the soluble or fusible initial stage, as well as with the fully hardened crosslinked resin upon curing thereof.

It is known to plasticize hardenable phenolic resins with ester-type plasticizers such as esters of phthalic acid, adipic acid or phosphoric acid. However, this manner of plasticizing, as well as the stability of the hardened masses with respect to chemicals, is unsatisfactory. Partial or whole esters of polyols with low molecular weight fatty acids, as well as the polyols themselves, have also been proposed as plasticizers for phenolic resins. However, the compatibility of these materials with phenolic resins is limited. Due to the hydrophilic nature of these compounds, the final, hardened resinous bodies become sensitive to water. The above-mentioned plasticizing materials do not participate in the reaction of resoles or in the hardening of Novolaks, for example with hexamethylenetetramine. In this way the plasticizing effect is only at the outside and only of a limited nature.

Since the outside or superficial plasticization of phenolic resins is unsatisfactory, there have been many attempts in the past to achieve internal plasticizing effects, i.e. to combine the plasticizer with the phenolic resin by a chemical reaction. It has been proposed, for example, to have resoles etherified with butanol react with the conjugated double bonds of wood oil fatty acid or with the hydroxy-oleic acid esters of castor oil. At present, it is generally assumed that a methylol group in ortho position and the phenolic hydroxyl group do participate to form with the double bond of the fatty acid so-called chromane ring systems.

Moreover, it is possible to have partial esters of polyols and monocarboxylic acids and/or dicarboxylic acids, which contain free alcoholic hydroxyl groups, and which react with the methylol groups of resoles with formation of ethers. These internally plasticized phenolic resins have a reduced reactivity and in view of the required high hardening temperatures they serve exclusively as a foundation for baking lacquers. They are useless as binders for example for laminated products and molding materials.

However, it is possible to use for this purpose unetherified resoles that are modified for this purpose with wood oil and/or natural resins. The formation of the chromane series and, therewith, an internal plasticization, occurs however only at temperatures above 160°. Since such high temperatures can not be used when working with phenolic resins that harden upon curing in course of conventional curing periods, it must be assumed that this type of modification produces exclusively an external plasticization. The lack of stability of hardened films towards solvents can also be attributed to this.

The rigidity of simple, completely hardened phenol-formaldehyde resins is undoubtedly due to the fact that the single phenol radicals are primarily connected to each other through methylene linkages. It has, therefore, been proposed to react di- or polyphenols with formaldehyde in which the phenol nuclei are spaced farther apart by longer aliphatic linkages. Di- and polyphenols of this type are described in French Patent 808,717 and are obtained by the reaction of chlorinated paraffins with phenols in the presence of Friedel-Craft's catalysts. Similar processes for the preparation of such polyphenols and the use thereof in the formation of phenol-formaldehyde resins are described in the following sources of literature:

German patent applications P 18,039, K 22,909 (DAS 1,026,071); U.S. Patents 2,859,203 and 2,859,204; W. R. Brookes, Ind. Eng. Chem. 53, 7 (1961) pages 570–572.

The use of polyphenols insures the production of well plasticized synthetic resins. However, the reactivity thereof is very low and not adequate for most purposes. A further disadvantage is the small content of aliphatically combined chlorine. As a result of this, the electrical and corrosive properties become impaired due to the unavoidable splitting off of halogen.

In French Patent 944,132 and in the corresponding U.S. Patent 2,623,891 there is described a process for the preparation of polyphenol bodies by the reaction of phenol with unsaturated fatty acids in the presence of Friedel-Craft's catalysts. The condensation with formaldehyde results in the production of well plasticized resins. A drawback of this process is the tedious preparation of the di- or polyphenols, as well as the low reactivity of these bodies.

It has now been found that it is possible to plasticize simple phenol-formaldehyde resins having as a basis phenol, cresols, xylenols or the like phenols, by the reaction thereof with expoxydized unsaturated oils or derivatives of epoxydized unsaturated fatty acids or epoxydized unsaturated fatty alcohols. Novolaks as well as resoles can be used in the same manner for reaction with epoxydized unsaturated oils or derivatives of epoxydized unsaturated fatty acids. The contact materials, such as oxalic acid, sulfuric acid, phosphoric acid or ammonia, amines, alkali metal or alkali earth metal hydroxides, still present in the phenolic resins as a result of the acid or basic condensation thereof, act in the present case as catalysts for the reaction of the phenol resin with the so-called epoxydized compounds. The addition of epoxide groups—carrying compounds at the reactive points of the phenolic resins—mainly at the phenolic hydroxyls or in the case of resoles also at the methylol groups—is demonstrated by the analytically determined reduction of epoxide groups—content of the reaction mixtures.

The epoxide compounds that can be combined with the phenolic resins for the purposes of the present invention, are in the first place epoxidized unsaturated fatty acid radicals—containing natural glycerides, such as soy oil, safflower oil, linseed oil and the like. There may also be mentioned epoxidized esters of synthetic unsaturated fatty acids as well as those obtained from tall oil fatty acid and glycerine and synthetic dialcohols, trialcohols and higher alcohols of various kinds. Also suitable for reaction with phenolic resins are epoxidized partial esters of unsaturated fatty acids with polyols which are easily obtained from unsaturated natural glycerides by reesterification with polyols, for example with glycerine in the form of mono- or diglycerides. As derivatives of epoxidized unsaturated fatty acids there may be mentioned also esters of monovalent alcohols, amides, nitriles, hydrazides hydrazidines or amidrazones which on the average contain one or more epoxide groups in the molecule. It is also possible to use epoxidized fatty acid esters with saturated monoalcohols or saturated fatty acids with unsaturated alcohols or unsaturated fatty acids with unsaturated alcohols. Examples are butylepoxy stearate from butyl oleate, glycidyl stearate from allyl stearate and epoxidized allyl oleate which may contain epoxide groups both in the fatty acid radical and in the alcohol radical. Epoxidized unsaturated oils and derivatives of epoxidized unsatruated fatty alcohols can easily be prepared in accordance with known processes. Depending upon the degree of unsaturation of the starting materials, it is possible to use, in accordance with the present invention, partially or completely epoxidized compounds. The reactions that take place between the epoxide groups of the aforesaid compounds and the phenol-formaldehyde condensation products, are not predicated upon the type of resin and they proceed under conditions usually applied in the production or elaboration of standard-type phenolic resins. The end products obtained after complete hardening of the resins are distinguished by outstanding plasticization. They have, aside from good mechanical properties and superior electrical values, also excellent stability towards solvents and chemicals. Phenol-formaldehyde resins plasticized in accordance with the present invention are particularly suitable for the production of laminated materials such as solid fabrics, hard paper capable of being stamped in the cold, molded masses having increased impact strength, insulating silk, insulating paper and elastic coatings of all kinds.

In the following examples it will be understood that the temperatures are in degrees centigrade.

EXAMPLE 1

250 gr. of a resole, prepared in known manner by condensation of 470 gr. of phenol, 400 gr. of 30% formaldehyde and 50 gr. of aniline at 80° followed by dehydration under a vacuum, are reacted with 200 gr. of soy oil (oxirane oxygen content: 6%) for 1½ hours at 130°. The epoxide groups content dropped during this reaction to two-thirds of the original value. By addition of further 150 gr. of 30% formaldehyde, 10 gr. of ammonia, condensation at 80° followed by dehydration under vacuum, the reactivity of the resin was adjusted to a curing period of about 5 minutes at 160°. The resin was clearly soluble in spirits.

A laminated hard paper was prepared, in accordance with well known methods, by impregnating an α-cellulose paper of 80 gr./m.$^2$ strength and upon drying, pressing 12 layers of such resin-impregnated paper. This was tested in accordance with DIN standard 53488 with respect to its capacity of being stamped at room temperature. Hard papers, which were prepared by using the resin of this example was found to have a stamping index value below 2. In comparison, a hard paper prepared from unplasticized phenolic resins was found to have a stamping index value above 4.

EXAMPLE 2

A Novolak was prepared from 470 gr. of phenol, 284 gr. of 36% formaldehyde and 4.7 gr. of oxalic acid by boiling and refluxing and then dehydrating under vacuum. 400 gr. of this Novolak were mixed with 200 gr. of epoxidized soy oil and reacted for 2 hours at 150°. The oxirane oxygen content dropped during this reaction to two-thirds of the original value. The resulting resin was capable of being hardened by addition of 3% hexamethylenetetramine in 3 minutes at 160°.

We claim:

1. A process for producing an internally plasticized phenol formaldehyde resin which comprises initially heat reacting at a temperature substantially within the range of 130 to 150° C. (1) a phenol-formaldehyde aniline condensation product with (2) an epoxidized soya oil, and thereafter continuing the heat reaction at above room temperature with addition of formaldehyde and ammonia and continuing the heat treatment until a cured stage is attained.

2. An internally plasticized phenol-formaldehyde resin produced according to the process of claim 1.

3. A process as set forth in claim 1 wherein (1) is a resole prepared by the condensation of phenol, aqueous formaldehyde and aniline in the approximate proportions of 470 parts phenol, 400 parts of 30% formaldehyde and 50 parts of aniline at 80° followed by dehydration under a vacuum and (2) epoxidized soya oil; and wherein (1) and (2) are used in the approximate proportions of 250 parts of (1) to 200 parts of (2) and are reacted for about one and one-half hours at a temperature of about 130°; and wherein the heat reaction is continued at about 80° with addition of about 150 parts of 30% formaldehyde and about 10 parts of ammonia followed by dehydration under vacuum.

4. An internally plasticized phenol formaldehyde resin produced in accordance with claim 3.

References Cited by the Examiner

UNITED STATES PATENTS

| 1,283,706 | 11/1918 | Edison | 260—57 |
| 2,907,727 | 10/1959 | Greenlee | 260—838 |
| 2,907,729 | 10/1959 | Greenlee | 260—19 |
| 2,967,838 | 1/1961 | Partansky | 260—19 |
| 3,121,068 | 2/1964 | Baum | 260—19 |

FOREIGN PATENTS 264,037    4/1929    Italy.

OTHER REFERENCES

Soviet Plastics, "Paper Laminates Impregnated with Epoxy-Phenol-Aniline-Formaldehyde Resin," February 1961, pages 27–28, copy available in 260–51.5.

Skeist, Epoxy Resins, Rheinhold Plastics Applications Series, Rheinhold Publishing Corporation, New York, 1958, 293 pages, pages 220–221 relied upon, copy in Scientific Library.

LEON J. BERCOVITZ, *Primary Examiner.*

JAMES A. SEIDLECK, *Examiner.*

R. W. GRIFFIN, F. McKELVEY, *Assistant Examiners.*